Aug. 27, 1935.   E. RICE, JR   2,012,892
REFRIGERATING METHOD AND APPARATUS
Filed April 12, 1934

Inventor:
Edward Rice Jr.
by his Attorneys
Howson & Howson

Patented Aug. 27, 1935

2,012,892

UNITED STATES PATENT OFFICE 2,012,892

REFRIGERATING METHOD AND APPARATUS

Edward Rice, Jr., New York, N. Y.

Application April 12, 1934, Serial No. 720,289

16 Claims. (Cl. 62—91.5)

This invention relates to an improved method of using solid refrigerants such as water ice, brine ice or solid carbon dioxide (popularly known as dry ice); refrigerants in which as a class a charge of state takes place from solid to a liquid or gas, when heat is applied thereto, and a reduction of volume occurs over the area where the heat is applied, the rate of which reduction is proportional to the amount of heat which is effectively applied to any given area.

An object of the invention is to provide refrigerating apparatus for use with solid refrigerants of the above stated character in which means is provided for transferring heat to small quantities of the solid refrigerant at the same rate as to comparatively large quantities with the result that approximately constant refrigerating temperatures can be maintained substantially as long as any of the refrigerant remains.

Another object is to provide a method of forming tongues or projections of the solid refrigerant which constitute extended surfaces for heat absorption from a refrigerated space or material, which surfaces remain substantially constant while the total volume of the refrigerant is decreasing.

More specifically an object of this invention is to provide means for using solid refrigerants in which heat from the refrigerated space or material is absorbed simultaneously, partly on extended surfaces of a solid metallic heat conductor which is chilled by direct contact with the refrigerant, and partly on surfaces of the solid refrigerant itself extended in the form of tongues or projections, the latter surfaces being formed by the action of separated portions of the metallic conductor while transmitting heat to the refrigerant.

Other objects and advantages of the inventon will appear in the specification when considered in connection with the accompanying drawing, wherein:

Figs. 8 and 9 are fragmentary perspective views of two different forms of the metallic heat conductor.

Figure 1:
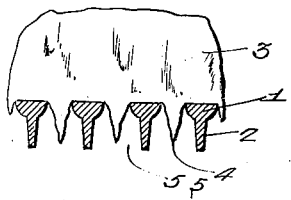
Figs. 1, 2 and 3 are diagrammatic sectional views showing different forms of the intermediate metallic heat conductor arranged between the refrigerant and the air to be cooled and constructed according to my invention.

In the known method of using solid refrigerants where substantially all the heat from the space or material to be refrigerated is transferred directly to the surface of the refrigerant by convecting air currents a considerable surface of the refrigerant must be exposed to these currents in order that sufficient of the refrigerant can be melted per hour to produce practicable amounts of refrigeration. Thus in the household water ice refrigerator the ice compartment must be maintained practically full to keep the refrigerator at the desired temperature; or say from 60 to 100 lbs. of ice must be kept in a refrigerator which only melts approximately 20 lbs. per day. More strikingly in a railway refrigerator car the icing schedule attempts to maintain from 8000 to 12,000 lbs. of ice in the bunkers, with reicing every day in hot weather, while the total daily meltage is only approximately 800 lbs. If the convecting air currents can be speeded up by a power driven fan a smaller exposed surface of ice, and consequently a smaller volume, can be used; but this arrangement is often impossible to provide. Also in this known method there is the additional drawback that the heat absorbing surfaces of the refrigerant usually get steadily less as the refrigerating process goes on, and thus the rate of meltage decreases and the refrigerating temperatures tend to rise.

Several known forms of apparatus have been designed to overcome this last drawback by confining the heat transfer to practically one surface of the ice, usually the bottom. This is done by placing in the top of the refrigerator a solid metal support for the ice, draining away the meltage, and permitting the warm air to contact only this support through which the heat is transferred to the bottom of the ice supply. Or at times the support is made of separated rods, an open wire mesh, or an open grating and the warm air contacts directly the bottom of the ice supply. These devices permit of a fairly constant refrigerating temperature while any of the ice covers the bottom of the ice compartment, but in either case the surface exposed for heat absorption, of ice or metal support or both, amounting substantially only to an area equal to the bottom area of the ice block, is so small that they are comparatively inefficient; since the rate of heat transfer to the ice from the air varies on the whole directly as the surface area of the ice or chilled surfaces that are exposed for heat absorption.

In my co-pending application Ser. 467,999 filed July 14, 1930 I disclose a method and apparatus for using solid refrigerants in which extended surfaces of a solid metallic conductor are provided for heat absorption, which surfaces are chilled by maintaining the solid refrigerant in contact with a comparatively small portion of the conductor. By this method a constant heat absorbing surface is provided as large as may be required to maintain any particular rate of ice meltage; and constant refrigerating temperatures can be secured practically as long as any ice remains in contact with the conductor; because the extended heat absorbing surfaces can be kept chilled to a constant low temperature, approaching that of the refrigerant, with only a small area of contact between the refrigerant and the conductor. This is accomplished by making the conductor of sufficient heat conducting capacity or cross section. In the above co-pending application I specified that the extended surfaces of the metallic conductor constituted the principal means for absorbing heat from the refrigerated space or material, that is the metallic conductor constituted the principal path of heat transfer to the refrigerant.

In my later co-pending application Ser. 679,435 filed July 7, 1933, of which this application is a continuation in part, I disclosed the fact that the extended surfaces of the metallic conductor need absorb only a part of the total heat abstracted from the refrigerated space or material, and that at times a cheaper and just as efficient apparatus can be built which permits the warm air derived from the refrigerated space to flow at the same time partly over the extended metal conductor and partly over the refrigerant itself. In Fig. 36 of that application, which is Fig. 1 of the present application, I showed a preferred form of such a construction in which the solid refrigerant is supported by gravity against separated portions of the metallic conductor, the extended heat absorbing portions of which project outwardly from the refrigerant containing bunker, and in which the refrigerant tends to melt down in the form of tongues or projections in the spaces intermediate of the separated portions of the conductor. These tongues of ice provide large additional heat absorbing surfaces which are substantially constant from a short time after the apparatus has been charged with the ice until the refrigerant is practically gone, and which are presented side by side with the extended portions of the metallic conductor for heat absorption from the refrigerated space.

My present application is filed for the purpose of illustrating in further detail some of the various forms which the separated portions of the extended metallic heat conductor may take; and for disclosing more fully the method by which this form of the extended metallic heat conductor may be used to produce large additional heat absorbing surface areas of the solid refrigerant itself.

The principles of operation of the extended metallic heat conductor arranged as an intermediate heat transfer agent between a solid refrigerant and a space or material to be refrigerated are in accordance with the ordinary physical laws of heat transfer and are fully set forth in my application of which this is a division in part, referred to above. When the conductor is so constructed that it presents a solid substantially continuous metal surface forming the bottom, or one of the side walls, of the refrigerant containing space, with the extended heat absorbing portions projecting away from the portion forming a wall of the refrigerant containing space in the form of metallic fins or plates, then the principal amount of heat reaching the solid refrigerant from the air of the refrigerated space must first be absorbed on the extended surfaces of, and be passed along through, the metal conductor to the ice. If a good heat conducting metal such as copper or aluminum is used, and sufficient extended surface and heat transmitting cross section is given such a continuous metal walled form of conductor, then almost any desired rate of heat transfer and consequent ice meltage can be achieved, within the limits of course of particular refrigerating compartment and kind of solid refrigerant used. But frequently the cost of such a conductor is out of line with its commercial value in some forms of refrigerating apparatus, such as a cheap household refrigerator of 100 lbs. ice capacity retailing at $40.00. In such a refrigerator the desirable temperatures below 50° can be maintained with a solid wall form of conductor having extended fins and containing metal to the value of $4 to $5; which is frequently too expensive. In a railway refrigerator car two or three hundred dollars' worth of an aluminum solid walled conductor, built up of an extruded finned section, could be incorporated in 2000 lb. ice bunkers at each end of the car and produced refrigerating temperatures equal to the best now obtained with 6000 lb. bunkers, in which the air circulates entirely over the ice. And the smaller bunker with the conductor as described could maintain temperatures down to the last 5% or 10% of the ice; but the cost of this form of conductor again might be excessive under the present conditions.

I have discovered in many forms of refrigerating apparatus using solid refrigerants, particularly those using water ice although other forms of solid refrigerants available in fairly large sized pieces may be used, that the advantages of the extended metallic conductor can be retained and at the same time a cheaper form of extended conductor used if the conductor consists of separated portions against which the refrigerant is supported in continuous contact, and the ice is caused to melt down in between the separated portions to provide large additional heat absorbing surfaces formed of the ice itself. The separated portions together form the bottom, a side wall, or the bottom and a side wall of the refrigerant containing space or bunker, and each of the separated portions has a surface exposed for direct contact with the ice and surfaces projecting away from the ice contacting surface for heat absorption from air circulating from the refrigerated space. The metal must be sufficiently thick and of sufficient conductivity to maintain the extended surface portions at a lower temperature than the contacting air from the refrigerated space, so that heat will be absorbed and transmitted to the ice by the metal. The surface in contact with the ice, and the extended surfaces absorbing heat, are so dimensioned and proportioned, in combination with the character of the metal used and its thickness, that the ice in contact with the conductor melts down at the rate required to produce the desired refrigeration. This required rate in turn is largely determined by the size of the ice tongues or projections, and consequently the size of their heat absorbing surfaces, which are formed in the spaces intermediate of the separated portions of the conductor. For instance a channel shaped conductor with 2" extended legs and a ¾" base in contact with the ice, and having portions separated 1" apart, if made of 1/16" thick copper might produce intermediate tapered tongues of ice 3" or 4" long; whereas if the portions were separated ½" the tongues of ice might be only 2" long. Again if the same sections were made of 1/16" galvanized iron and spaced 1" the tongues of ice might be only 1" long, and if spaced 2" about 2" or 3" long, but the total rate of ice meltage would of course be considerably less than when using the copper which has a heat conductivity factor several times that of iron for the same thickness. Or again ice tongues 5" or 6" long might be produced by wedged shaped sections of aluminum having a ⅜" base in contact with the ice, tapering to 1/16" over a 4" depth and spaced an inch or an inch and a half apart. It is thus seen that with an inexpensive amount of metal, frequently cheap galvanized iron, a combination of extended heat absorbing metal conductor surfaces and extended heat absorbing ice surfaces can be used according to my invention to secure rates of ice meltage and refrigerating results heretofore impossible to achieve with similar amounts of ice. In the household refrigerator described above a dollar's worth of material in a separated metal conductor will provide enough heat absorbing surface, along with the surfaces of the intermediate tongues of ice, to keep the desired refrigerating temperatures. While in the railway refrigerator car a hundred dollars' worth of material will provide the extended conductor surfaces necessary to produce the additional ice surfaces for absorbing the required total amount of heat.

In constructing a conductor of this nature it can be so designed when desired to compensate for the progressive lessening of the air temperature, and consequent lessening rate of heat absorption by the extended conductor surfaces as the convection currents pass from one end of the conductor to the other, in order to have the ice melt down evenly the length of the conductor. This can be done by making the extended surfaces of greater area at the end of the flow than at the beginning, say increasing in area by two or three times by means of grooves or corrugations; or it can be done by making the surface of each portion of the conductor that is in contact with the ice somewhat greater in area at the beginning of the air flow, say tapering from 1" in width where the warm air begins to contact the conductor to ½" at the end of the flow where the cooler air comes off.

It is evident from the foregoing description of my invention that the previously known method of exposing the bottom of the ice for heat absorption by resting it on separated flat metal strips, parallel rods, or open wire mesh could produce only a fraction of the total heat absorbing surfaces, both of metal and of ice, which are produced by my method; and consequently only a fraction of the rate of ice meltage from the same amount of ice and therefore of refrigerating power. In the previous known method the surface of the metal strip, rod, or wire exposed for heat absorption from the air was practically no greater than its surface in contact with the ice so that the same amount of heat, or more, could have been observed by that portion of ice by direct contact with the air. And since the ice could only melt slowly where it contacted with the metal strips there was little or no tendency to melt down in the spaces intermediate of the supporting strips, and thus no tendency to form the large surface tongues or projections of ice which are formed by my method.

Another method of increasing the heat absorbing surfaces of a given quantity of water ice which has been tried in the past, but which is also comparatively inefficient when compared with the method which I disclose, is that of using the ice in crushed or broken form. When the crushed ice is dumped into a bunker and air convected over it it tends to take the form of a solid and cone shaped mass which effectively contacts the air for heat absorption only on its outer surface, and thus acts substantially as a solid block with a steadily diminishing heat absorbing surface.

Referring to the attached drawing in Fig. 1 the parallel separated portions of the metallic conductor are shown as consisting of substantially T-shaped sections in which 1 indicates the conductor surface presented for direct contact with, and transfer of heat to, the refrigerant; and 2 is the conductor surface exposed for contact with, and heat absorption from, the warm air from the refrigerated space which flows through passage 5. A block of ice 3 is shown supported against the metallic conductor and 4 indicates the tongues or projections of ice which are formed in the intermediate spaces between the separated sections of the conductor. In operation when a block of ice is placed against the conductor sections they are chilled and immediately begin to absorb heat from the warm air of the refrigerated space on their extended surfaces 2. This heat is transmitted by the metal through the substantial thickness or cross section shown to the contacting ice, and the ice at the contacting points continues to melt as long as the heat absorbing surfaces are at a lower temperature than the air flowing over them from the refrigerated space. The conductor sections shown, although other metals may be used, are preferably of aluminum, a good heat conducting metal, and are made by casting or extrusion. They are sufficiently thick that the heat absorbing surfaces 2 are maintained only a few degrees higher than the melting temperature of the ice. The surfaces 2 are so extended that they absorb heat at a considerably higher rate at first than the intermediate surfaces of the ice exposed directly to the warm air and lying between the metal sections. When the block of ice is first placed against the conductor these intermediate ice surfaces do not have sufficient area to absorb heat at the same rate from the air as can the extended conductor surfaces. Consequently the ice melts faster where it contacts the metal than in the intermediate spaces, and in these spaces the ice begins to project out between the metal sections. As this action continues the projecting ice surfaces grow larger and larger, and absorb more and more heat, until a point of equilibrium is reached where the tongues of ice have sufficient surface and can absorb sufficient heat to melt that portion of the ice block lying between the conductor sections just as fast as the metal conductor sections can melt the portion of the ice block that is in contact with them. These rates of melting will continue more or less balanced as long as the ice lasts, and the tongues of ice will remain about the same size unless the temperature of the circulating air varies considerably.

Separated conductor sections such as those shown in Fig. 1 can be used either horizontally at the bottom of the ice compartment; or vertically at one side the ice being supported against them on an inclined metal base which causes it to gravitate down against the side wall, or both vertically and horizontally, the latter forming the inclined base. As the sections shown however are comparatively thick, and therefore of high heat transfer capacity, as compared with their heat absorbing surfaces, they are particularly adapted to be used vertically in which position large portions of the conductor sections are at times liable to be out of contact with the ice; and therefore to keep these portions cold so they can continue to absorb heat a considerable thickness of metal, and therefore of high heat transfer capacity, is needed. If these sections were spaced further apart the ice tongues would reach a greater length before the point of equilibrium in meltage could be reached as described above. On the other hand if the same spacing and surface area of the conductor sections were maintained but the conductor sections made of iron, a poorer heat conductor than aluminum for the same cross section, or if their cross section were made considerably less, then the ice tongues would tend to be smaller, at the equilibrium point, than indicated in the drawing. Thus the heat transfer capacities of the different metals for different thicknesses, distances, and temperature differentials are so well recognized, as are also the heat absorbing capacities of the metal and ice surfaces, that the interaction of the warm air, the metal conductor and the refrigerant can be predicted and many different forms of refrigerating apparatus built according to my invention to meet various requirements.

Figure 2:
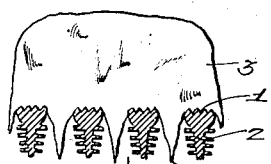

Fig. 2 shows the same general form of conductor as Fig. 1 with the same spacing of the thick metal sections. However an increased rate of ice melting is provided for by making the heat absorbing surfaces 2 of the conductor considerably greater by extending them in a series of small grooves or fins as shown. The heat transfer surface to the ice, indicated at 1, is also made greater by a saw tooth or grooved construction. The resulting increased rate of ice meltage by the conductor sections in turn produces a larger ice tongue section 4, as shown, before a melting equilibrium point is reached.

Figure 3:
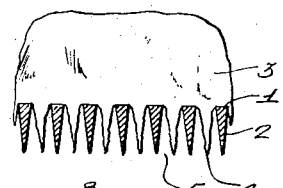

Fig. 3 shows the same general form of apparatus as Fig. 1 except that the conductor is made of wedge shaped sections with a short base opposed to the ice, and a long leg 2 to the air. Very long tongues of ice 4 are indicated here such as might be formed if the conductor sections were made of thick aluminum or copper and were subjected to a constant stream of comparatively warm air, such as might flow through a household room cooling unit where the so-called refrigerating temperatures would always be very high and the air flowing into the unit would be at a great differential over the ice and metal conductor surfaces.

Figure 4:
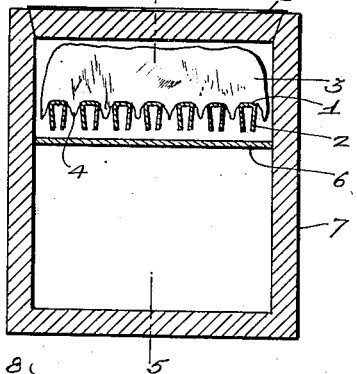
Fig. 4 is a vertical section of a refrigerator in which the separated portions of a metallic heat conductor are shown between the refrigerant and the air to be cooled, and also the tongues or projections of ice formed intermediate of the separated portions of the conductor.
Figure 5:
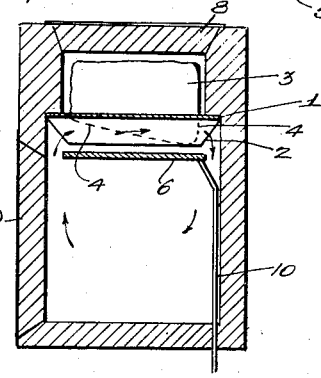
Fig. 5 is a section on 5—5 of Fig. 4

Fig. 4 is a vertical section through a household refrigerator of the top-icer type in which 7 is the usual insulated refrigerator casing having an access lid 8 for the ice compartment. The conductor is in the form of separated parallel channel-shaped sections of metal, having surfaces 1 in contact with the ice and the surfaces 2 of the legs exposed to the air for heat absorption. These legs are inclined slightly toward each other as shown in order to permit more space between them and the tongues of ice 4 for air circulation, and to facilitate heat transfer from the air to the cold metal and ice surfaces. Beneath the conductor is the shelf 6 of insulating material which forms both a drip pan to catch the meltage and condensation, and also a baffle to guide the circulating air over the conductor and ice tongue surfaces. Fig. 5 is a section on the line 5—5 of the refrigerator shown in Fig. 4, 9 being the access door to the food storage compartment, and 10 a drain pipe to carry off the meltage from the drip pan 6. This insulated drip pan and baffle is shown as being spaced from the front and rear walls of the refrigerator in order to permit circulation of air from the refrigerated compartment over the heat absorbing surfaces 2 and 4. As there is greater heat access into the refrigerator at the front because of the door framing, door openings etc., the air circulation is in the direction shown by the arrows. The long legs 2 of the conductor sections may have if desired an increased heat absorbing surface toward the back (not shown) in order to equalize the rate of heat absorption front and back and cause the ice to melt down evenly. Such a construction is illustrated under Fig. 9. The tongues of ice 4 tend to be shorter in front as shown because the warmer air will produce the same or greater rate of meltage for less surface of ice exposed for heat absorption. In this form of installation sufficient ice meltage can be secured by using a very cheap form of conductor such as galvanized iron. Longer ice tongues than shown can be formed by narrowing the bases of the channel sections which are in contact with the ice, by spacing them further apart, by making them of thicker material, or by making them of a better heat conducting material such as aluminum or copper.

Figure 6:
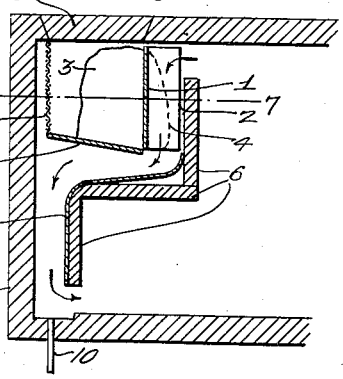
Fig. 6 is a portion of the vertical section of a refrigerated railway car or compartment constructed according to my invention.

Fig. 6 shows a vertical section through one end of a railway refrigerator car in the bunker compartment of which is incorporated a metallic conductor on the inside vertical wall constructed according to my invention. The insulated car compartment 7 has an access lid 8 to the ice bunker. The bottom of the bunker is formed of a metal floor 11 inclined toward the inside bunker wall as shown to permit the ice 3 to gravitate down against the inside heat transfer wall and form ice tongues as previously described. This wall is composed of separated parallel channel shaped metal conductor sections (more clearly shown in Fig. 7) which present surfaces 1 for contact with the ice, and extended surfaces 2 for heat absorption from the air flowing from the refrigerated space. This air flow is guided by insulated baffles or bulkheads 6 as shown, the warm air coming in contact with the cold ice tongues and extended conductor surfaces at the top, and, on being cooled and made heavier, flowing in the direction of the arrows to the bottom of the car where it is warmed by the heat coming through the walls of the car or from the lading; the warmed air rises, being lighter, and the circulation cycle is continued and repeated. A curved metal baffle 12, inside the insulated baffle 6, serves to guide the air flow, and also the meltage which is continuously drained off at 10. As this form of construction permits some of the warm air from the refrigerated compartment to have access to the main body of ice 3 inside the bunker through the spaces between the conductor sections, the inclined metal bunker floor 11 is preferably made of bars separated several inches to permit an auxiliary warm air flow directly over the body of ice 3. The space between the bars will tend to remain open because in this position there is practically no heat absorption by the bars and tendency to form tongues of ice. Although the main air flow, and consequently the principal heat transfer to the refrigerant, will be in the passage marked by the arrows, yet this auxiliary air flow and heat transfer in the bunker itself may be useful when a quick cooling down of a warm lading is required, and consequently the highest possible rate of ice meltage. This auxiliary air flow over the main body of the ice is increased by the spaced relation indicated between the bunker floor 11 and the compartment walls 7, the ice space being bounded by the foraminous screen 13.

Figure 7:
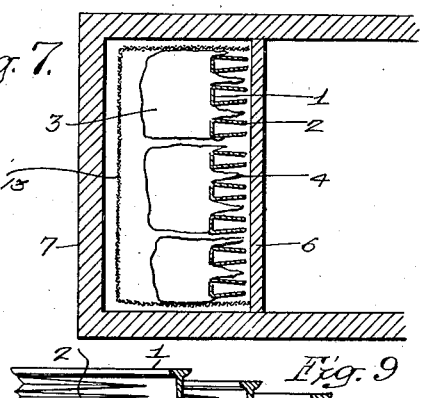
Fig. 7 is a horizontal section on 7—7 of Fig. 6.

Fig. 7 is a horizontal section taken on 7—7 of Fig. 6 with the channel shaped conductor sections having surfaces 1 in contact with the ice 3, and extended surfaces 2 for heat absorption. Ice tongues 4 are formed as previously described and the insulated bulkhead 6 guides the air currents from the refrigerated space over the heat absorbing surfaces.

Figure 8:
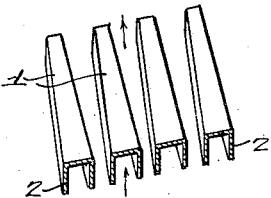

Figs. 8 and 9 are diagrammatic views of different shaped conductor sections separated so that when a block of ice is supported against the surfaces 1 tongues of ice will project intermediate of the conductor sections as previously described. A channel shaped conductor section is illustrated in Fig. 8, and a substantially T-shaped section in Fig. 9. Both sections are constructed so as to compensate for the larger temperature differential between the contacting air and the cold metal surfaces 2 at the front end than at the back end, when the air flows in the direction of the arrows, so that the block of ice will melt down evenly. In Fig. 8 this is accomplished by maintaining the heat absorbing surfaces 2 of the same area the length of the section, but making the ice contacting surface 1 of larger area at the front end as shown, so that the greater rate of ice meltage that must be carried out at the warmer front end, without reducing the depth of the ice block any faster at the warmer end of the conductor than at the colder end, is achieved on a plane parallel to the contacting metal surface, not normal to it; and thus the rate at which the ice block melts down against the conductor is controlled and can be held approximately even at both ends. Fig. 9 shows another way of controlling the way in which the ice melts down. In Fig. 9 a substantially T-shaped section is shown, with the ice contact surfaces 1 of the same area the length of the sections, but with the heat absorbing surfaces 2 steadily increasing in area as the air flowing by, indicated by arrows, becomes colder, the increased area being achieved by corrugations or grooves as shown. This construction tends to deliver the same amount of heat at both ends of the conductor section through the same contact areas 1, and therefore the ice tends to melt down evenly. These methods of causing the ice to melt down evenly are not the principal feature of my invention, but are often useful for making easier the problem of fitting in ice blocks when reicing; and for retaining a larger amount of ice contact with the conductor surfaces when the ice supply gets very low. It will be understood that these methods do not produce an equal area of ice tongues front and back, but rather tend to make the ice tongues larger at the back. This however always tends to occur in the use of my invention when the air flow is warmer at one end of the conductor section than at the other, particularly when the conductor sections are arranged vertically and the convection currents tend to be stronger, the ice tongues being deeper and of greater area toward the end of the air flow over tongues and conductor.

Figure 10:
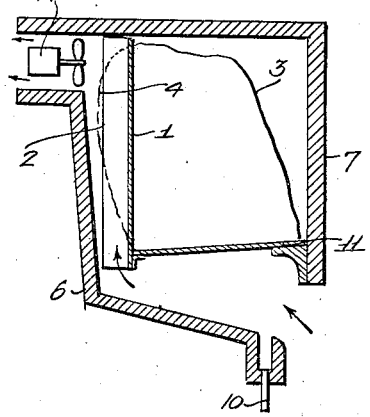
Figs. 10 and 11 are vertical sections of two forms of refrigerating units incorporating my invention.
Figure 11:
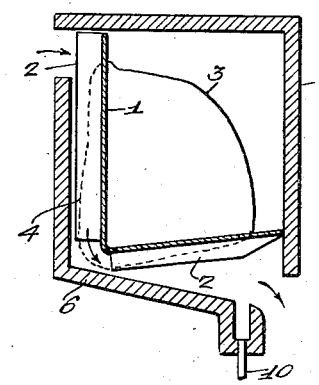

Fig. 10 illustrates a small bunker or cooling unit which may be used in a truck body, cooling compartment, room etc. where electric current is available for driving a fan or blower to increase the air flow over the surfaces of the conductor and ice tongues, and thus increase the rate of ice meltage per hour. Cooling unit walls 7 together with the inclined metal base 11 and conductor surfaces 1 define the refrigerant containing space, in which a block of ice 3 is shown. The separated conductor sections, which may be similar to those shown in Fig. 1, have extended portions 2 in the air duct defined by the baffle walls 6 and the refrigerant containing space. Tongues of ice 4 are formed intermediate of the conductor sections. The inclined metal floor holds the ice in contact with the vertical conductor. The fan 14 is shown preferably drawing the air to be cooled up over the conductor and ice tongue surfaces in the direction of the arrows, although the fan may be reversed if desired. When the air flow is as shown the ice tongues tend to be smaller at the bottom where the air is warmer, as indicated by the dotted lines. The meltage is continuously drained off at 10. Fig. 11 is a similar cooling unit arranged without the fan, the air flow taking place in the direction of the arrows by natural convection over the ice tongue and conductor surfaces 4 and 2. In this unit the separated sections of the conductor form both the bottom and a side wall of the refrigerant containing space as shown, the bottom sections being inclined toward the vertical sections to maintain the ice 3 in continuous contact. The bottom and side conductor sections may be metalically joined as shown, or they may be separate if desired. The tongues of ice 4 will tend to take the shape indicated by the dotted line. The meltage is continuously drained off at 10.

Without limiting myself to the constructions shown in the drawing what I claim is—

1. A refrigerating apparatus, in which a solid refrigerant such as water ice, brine ice, or solid carbon dioxide is used as the refrigerating medium, comprising an insulated compartment which forms the refrigerated space for the refrigerated material, and a refrigerant containing space adjacent to said refrigerated space, in combination with a solid metallic heat conductor presenting surfaces for heat absorption from the refrigerated space of greater area than the surfaces of the conductor presented in the refrigerant containing space for heat transfer to the refrigerant; together with means for continuously draining off the meltage or products of dissolution of the solid refrigerant from the area between the conductor and the refrigerant; and means for supporting the refrigerant in contact, or in a substantially uniform or controlled heat exchange relation, with the metallic conductor; the capacity of said conductor to transmit heat along in the direction of the refrigerant from the surfaces presented for heat absorption being sufficient, by reason of its thickness or cross section, to maintain the heat absorbing surface areas at a lower temperature than that of the refrigerated space; said conductor being formed of a number of separated pieces, or of one or more pieces in which openings are cut, the spaces formed by such separations or openings serving to permit the solid refrigerant, when melting down against the conductor, to form fins of ice for the purpose of providing additional surfaces for the absorption of heat from the circulating air of the refrigerated space.

2. In refrigerating apparatus using solid refrigerants such as water ice, brine ice, or solid carbon dioxide as the refrigerating medium, a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat absorbing areas and the said areas in contact with the solid refrigerant whereby portions of the solid refrigerant intermediate of the said contact areas tend to be exposed for heat absorption to air from the refrigerated space in the form of fins.

3. In refrigerating apparatus using solid refrigerants such as water ice, brine ice, or solid carbon dioxide as the refrigerating medium, a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat absorbing areas and the said areas in contact with the solid refrigerant, whereby portions of the solid refrigerant intermediate of the said contact areas tend to be exposed for heat absorption to air from the refrigerated space in the form of fins, said metallic heat conductor being composed of a number of separated substantially parallel sections arranged at the bottom of the refrigerant containing space and which forms supports for the solid refrigerant.

4. In refrigerating apparatus using solid refrigerants such as water ice, brine ice, or solid carbon dioxide as the refrigerating medium, a metallic heat conductor having a plurality of surface areas in continuous contact with the solid refrigerant and a plurality of surface areas in contact with air from the refrigerated space, said latter areas being extensions of and greater than said former areas, and absorbing heat from the air of the refrigerated space, the said conductor forming an all-metallic path of good heat transfer capacity between the said heat absorbing areas and the said areas in contact with the solid refrigerant, whereby portions of the solid refrigerant intermediate of the said contact areas tend to be exposed for heat absorption to air from the refrigerated space in the form of fins, said metallic heat conductor being composed of a number of separated substantially parallel sections arranged vertically at one side of the refrigerant containing space; in combination with means located at the bottom of the refrigerant containing space for supporting the solid refrigerant, said means being inclined toward the said vertically arranged sections whereby the solid refrigerant is maintained in continuous contact with the said sections.

5. In refrigerating apparatus using solid refrigerants such as water ice, brine ice, or solid carbon dioxide as the refrigerating medium, a metallic heat conductor having a plurality of surface areas in continuous contact with the solid refrigerant and a plurality of surface areas in contact with air from the refrigerated space, said latter areas being extensions of and greater than said former areas, and absorbing heat from the air of the refrigerated space, the said conductor forming an all-metallic path of good heat transfer capacity between the said heat absorbing areas and the said areas in contact with the solid refrigerant, whereby portions of the solid refrigerant intermediate of the said contact areas tend to be exposed for heat absorption to air from the refrigerated space in the form of fins, said metallic heat conductor being composed of a number of separated substantially parallel sections arranged vertically at one side of the refrigerant containing space, and a number of separated substantially parallel sections arranged at the bottom of the refrigerant containing space and forming a support for the solid refrigerant, said latter sections being inclined toward the said vertically arranged sections whereby the solid refrigerant is maintained in continuous contact with the said vertically arranged sections.

6. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of a number of separated substantially parallel sections forming a wall of the refrigerant containing space, and against which sections the solid refrigerant is held in continuous contact by gravity; together with partition means cooperating with said conductor sections to form open ended ducts through which air from the refrigerated space may circulate.

7. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of a number of separated substantially parallel sections forming a wall of the refrigerant containing space, and against which sections the solid refrigerant is held in continuous contact by gravity; together with partition means cooperating with said conductor sections to form open ended ducts through which air from the refrigerated space may circulate; and means for setting up a forced circulation of air from the refrigerated space through said ducts.

8. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel channel shaped sections, the bases of which sections form a wall of the refrigerant containing space and against which the solid refrigerant is held in continuous contact by gravity, and the legs of which sections project outwardly from the refrigerant containing space.

9. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel channel shaped sections, the bases of which sections form a wall of the refrigerant containing space and against which the solid refrigerant is held in continuous contact by gravity, and the legs of which sections project outwardly from the refrigerant containing space, said legs being inclined toward each other from the said bases in order to permit greater access of air from the refrigerated space to the fins of solid refrigerant lying intermediate of the said channel shaped sections.

10. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel wedge shaped sections, the short base of which sections forms a wall of the refrigerant containing space and against which the solid refrigerant is held in continuous contact by gravity, and the longer leg of which sections projects outwardly from the refrigerant containing space.

11. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel T-shaped sections, the bases of which sections form a wall of the refrigerant containing space and against which the solid refrigerant is held in continuous contact by gravity, and the legs of which sections project outwardly from the refrigerant containing space.

12. In refrigerating apparatus using solid refrigerants such as water ice, brine ice, or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel sections the surfaces of which, presented for heat absorption to air from the refrigerated space, are extended in the form of grooves or corrugations.

13. In refrigerating apparatus using solid refrigerants such as water ice, brine ice or solid carbon dioxide as the refrigerating medium a metallic heat conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins, said conductor being composed of separated substantially parallel sections the surfaces of which, presented to the solid refrigerant for heat transfer thereto, are extended in the form of grooves or corrugations.

14. In refrigerating apparatus using solid refrigerants such as water ice, brine ice, or solid carbon dioxide as the refrigerating medium a metallic heat conductor of the character described composed of separated substantially parallel sections the surfaces of which, presented for heat absorption to air flowing from the refrigerated space, increase in area from one end of said sections to the other, said increase taking place in the same direction as the flow of air over said sections, and being formed of grooves or corrugations of the said metallic sections.

15. In refrigerating apparatus using solid refrigerants such as water ice, brine ice, or solid carbon dioxide as the refrigerating medium a metallic heat conductor of the character described composed of separated substantially parallel sections the surfaces of which, presented to the solid refrigerant for heat transfer thereto, increase in area from one end of said sections to the other, said increase taking place in a direction opposite to the air flowing from the refrigerated space over said sections.

16. In a refrigerating process using solid refrigerants such as water ice, brine ice, or solid carbon dioxide the method of providing, for direct heat absorption from air derived from the refrigerated space, substantially constant surfaces of the solid refrigerant extended in the form of fins which consists in transferring to the refrigerant by means of separated sections of a metallic heat conductor a portion only of the total amount of heat abstracted from the refrigerated space, and maintaining the solid refrigerant gravitationally in continuous contact with said sections of the metallic conductor, the rate of heat transfer to the surface of the refrigerant by said contacting sections being greater than the rate of heat transfer that could be maintained from air derived from the refrigerated space directly to a surface of the solid refrigerant of equal area to that area of the solid refrigerant in contact with the said sections; the said conductor having a plurality of surface areas in continuous contact with the solid refrigerant and a plurality of surface areas in contact with air from the refrigerated space, said latter areas being extensions of and greater than said former areas and absorbing heat from the air of the refrigerated space, the said conductor forming an all-metallic path of good heat transfer capacity between the said heat-absorbing areas and the said areas in contact with the solid refrigerant, whereby portions of the solid refrigerant intermediate the said contact areas tend to be exposed for heat absorption to air from the refrigerated space in the form of fins EDWARD RICE, Jr.